(12) United States Patent
Cheng

(10) Patent No.: US 12,421,123 B2
(45) Date of Patent: Sep. 23, 2025

(54) METHODS FOR EXTRACTING BORON FROM AN ORGANIC SOLUTION

(71) Applicant: Albemarle Corporation, Charlotte, NC (US)

(72) Inventor: Chi Hung Cheng, Baton Rouge, LA (US)

(73) Assignee: ALBEMARLE CORPORATION, Charlotte, NC (US)

( * ) Notice: Subject to any disclaimer, the term of this patent is extended or adjusted under 35 U.S.C. 154(b) by 795 days.

(21) Appl. No.: 17/423,250

(22) PCT Filed: Jan. 31, 2020

(86) PCT No.: PCT/US2020/016013
§ 371 (c)(1),
(2) Date: Jul. 15, 2021

(87) PCT Pub. No.: WO2020/167495
PCT Pub. Date: Aug. 20, 2020

(65) Prior Publication Data
US 2022/0081306 A1    Mar. 17, 2022

Related U.S. Application Data

(60) Provisional application No. 62/806,206, filed on Feb. 15, 2019.

(51) Int. Cl.
| | | |
|---|---|---|
| *C01B 35/12* | (2006.01) | |
| *B01D 11/04* | (2006.01) | |
| *C02F 1/02* | (2023.01) | |
| *C02F 1/26* | (2023.01) | |

(52) U.S. Cl.
CPC ........ *C01B 35/124* (2013.01); *B01D 11/0492* (2013.01); *C02F 1/02* (2013.01); *C02F 1/26* (2013.01)

(58) Field of Classification Search
None
See application file for complete search history.

(56) References Cited

U.S. PATENT DOCUMENTS

| | | | |
|---|---|---|---|
| 3,433,604 A * | 3/1969 | Grinstead | C01F 5/30 423/283 |
| 3,855,292 A | 12/1974 | Wollweber et al. | |
| 4,557,913 A | 12/1985 | Davis et al. | |
| 5,219,550 A | 6/1993 | Brown et al. | |
| 5,676,916 A | 10/1997 | Wilkomirsky | |
| 5,939,038 A | 8/1999 | Wilkomirsky | |
| 5,993,759 A | 11/1999 | Wilkomirsky | |
| 2013/0101484 A1 | 4/2013 | Perez et al. | |

FOREIGN PATENT DOCUMENTS

| | | |
|---|---|---|
| CN | 101565188 A | 10/2009 |
| CN | 104860326 A | 8/2015 |
| CN | 106587090 A | 4/2017 |
| JP | 10249330 A | 9/1998 |

OTHER PUBLICATIONS

Garrett, D.E.; "Handbook of Lithium and Natural Calcium Chloride"; Amsterdam, Elsevier, 2004; pp. 126-129.

* cited by examiner

*Primary Examiner* — Yun Qian
(74) *Attorney, Agent, or Firm* — KDW Firm PLLC

(57) ABSTRACT

One or more methods are described for extracting boron. The one or more methods include combining a combination comprising an alcohol, an organic solvent and boron, with an aqueous solution comprising an alkali hydroxide so as to form an organic layer and an aqueous layer. The aqueous layer may be separated from the organic layer.

6 Claims, No Drawings

METHODS FOR EXTRACTING BORON FROM AN ORGANIC SOLUTION

CROSS-REFERENCE TO RELATED APPLICATIONS

This application is a National Stage of International Application No. PCT/US2020/016013, filed on Jan. 31, 2020, which application claims the benefit of U.S. Provisional Application No. 62/806,206, filed Feb. 15, 2019. Each patent application identified above is incorporated here by reference in its entirety.

FIELD

The present disclosure generally relates to one or more methods for extracting boron from an organic solution.

BACKGROUND

This section introduces information that may be related to or provide context for some aspects of the techniques described herein and/or claimed below. This information is background facilitating a better understanding of that which is disclosed herein. Such background may include a discussion of "related" art. That such art is related in no way implies that it is also "prior" art. The related art may or may not be prior art. The discussion is to be read in this light, and not as admissions of prior art.

With the advancement of battery technology for applications in electronics, in particular lithium-based batteries, the value of lithium as a commodity has risen substantially in the market in recent years. Lithium salts are extracted and purified from salt brines around the world.

In commonly used commercial extraction methods, naturally occurring lithium containing brines are concentrated by evaporation of water in a series of evaporation ponds. As the brine concentrates, various salts such as halite and potash precipitate out. The concentrated brine is then transported by tank trucks and unloaded into storage tanks. A typical concentrated brine can comprise varying amounts of lithium (Li), boron (B), magnesium (Mg), calcium (Ca), sodium (Na), iron (Fe), potassium (K), chlorine (Cl), sulfate, and nitrate. Impurities are then removed from the concentrated brine. Various commercial methods are available for removal of such impurities. In this connection, please see, for example, U.S. Pat. Nos. 3,855,292, 5,219,550, 5,676,916, and Garrett, D. E. (2004), Handbook of Lithium and Natural Calcium Chloride, Amsterdam, Elsevier, pp. 126-129.

In one commercial method, impurities are removed from a concentrated brine through multiple purification steps, prior to the conversion to high purity lithium products, such as lithium carbonate and lithium chloride. One of the purification steps, namely the solvent extraction (SX) process, is used to remove boron from the brine, reducing its content, for example, from a nominal 8,000 ppm to less than 50 ppm. The SX process can comprise: (a) acidification of the brine with hydrochloric acid to convert the boron species to boric acid, (b) extraction of boron from the acidified brine by contacting it with an alcohol-kerosene organic solution in multistage countercurrent liquid-liquid extraction operations, (c) re-extraction of boron from the boron loaded organic solution to less than about 100 ppm with water or diluted caustic in multistage countercurrent re-extraction operations, so the organic can be recycled to (b). Overall, the SX process requires a volumetric ratio of water to concentrated brine of greater than approximately 1.3:1, generating a tailwater waste stream that is enriched with boron, for example approximately 6,000 to 8,000 ppm of boron. The tailwater waste stream is then transported to the evaporation ponds. Limitations often encountered in attempting to enlarge the output of such methods is the lack of availability of water and the pre-established capacity of the evaporation ponds.

Thus, there is a need for new and improved methods for concentrating lithium containing brines that minimize or reduce the impact from these and other limitations.

SUMMARY

In general, the present disclosure provides one or more methods for extracting boron from an organic solution.

In an aspect, a method is provided comprising (A) combining in a container (i) a combination comprising an alcohol, an organic solvent, and boron; and (ii) an aqueous solution comprising about 3 wt. % to about 25 wt. % of an alkali hydroxide based on total weight of the aqueous solution. The molar ratio of the alkali hydroxide to the boron is about 0.5 to 2.0, and the volume ratio of the combination to the aqueous solution is in the range of from about 10:1 to about 25:1. The method also includes heating content of the container to a temperature in the range of from about 20° C. to about 100° C. until the content comprises an organic layer and an aqueous layer, and the aqueous layer comprises greater than about 95% of the boron from the combination. The method also includes separating the aqueous layer from the content of the container.

One or more aspects include the method of any preceding paragraph in which the method also includes (D) separating greater than about 50% of the boron from the aqueous layer.

One or more aspects include the method of the preceding paragraph in which the method also includes (E) using the aqueous layer remaining after (D) as all or part of the aqueous solution in (A).

One or more aspects include the method of any preceding paragraph in which the temperature in (B) is in the range of from about 40° C. to about 80° C.

One or more aspects include the method of any preceding paragraph in which the temperature in (B) is in the range of from about 50° C. to about 70° C.

One or more aspects include the method of any preceding paragraph in which the alkali hydroxide is sodium hydroxide, potassium hydroxide, or lithium hydroxide.

One or more aspects include the method of any preceding paragraph in which the boron is separated from the aqueous layer as sodium borate.

One or more aspects include the method of any preceding paragraph in which the alkali hydroxide is present in the aqueous solution in an amount ranging from about 5 wt. % to about 25 wt. %, based on the total weight of the aqueous solution.

In another aspect, a method is provided comprising (A) contacting a combination comprising an alcohol, an organic solvent, and boron with an aqueous solution comprising an alkali hydroxide at conditions sufficient so as to form an organic layer and an aqueous layer. The alkali hydroxide is present in an amount in the range of from about 3 wt. % to about 25 wt. %, based on the total weight of the aqueous solution. The molar ratio of the alkali hydroxide to the boron is in the range of about 0.5 to 2.0. The aqueous layer comprises greater than about 95% of the boron from the combination. The volume ratio of the combination to the aqueous solution is in the range of from about 10:1 to about 25:1. The method also include separating the aqueous layer from the organic layer.

One or more aspects include the method of the preceding paragraph in which the combination and aqueous solution are heated to a temperature is in the range of from about 20° C. to about 100° C.

One or more aspects include the method of any of the two preceding paragraphs in which the method further includes (C) separating greater than about 50% of the boron from the aqueous layer.

One or more aspects include the method of any of the preceding paragraph in which the method further includes using the aqueous layer remaining after (C) as all or part of the aqueous solution in (A).

One or more aspects include the method of any of the four preceding paragraph in which the temperature in (A) is in the range of from about 40° C. to about 80° C.

One or more aspects include the method of any of the five preceding paragraphs in which the alkali hydroxide is selected from the group consisting of sodium hydroxide, potassium hydroxide, and lithium hydroxide.

One or more aspects include the method of any preceding paragraph in which the boron is separated from the aqueous layer as sodium borate.

While multiple embodiments are disclosed, still other embodiments will become apparent to those skilled in the art from the following detailed description. As will be apparent, certain embodiments, as disclosed herein, are capable of modifications in various obvious aspects, all without departing from the spirit and scope of the claims as presented herein. Accordingly, the detailed description are to be regarded as illustrative in nature and not restrictive.

Definitions

To more clearly define the terms used in this disclosure, the following definitions are provided. Unless otherwise indicated, the following definitions are applicable to this disclosure. To the extent that any definition or usage provided by any document incorporated here by reference conflicts with the definition or usage provided herein, the definition or usage provided in this disclosure controls.

In this disclosure, features of the subject matter are described such that, within particular aspects, a combination of different features can be envisioned. For each and every aspect and each and every feature disclosed herein, all combinations that do not detrimentally affect the designs, compositions, processes, or methods described herein are contemplated with or without explicit description of the particular combination. Additionally, unless explicitly recited otherwise, any aspect or feature disclosed herein can be combined to describe inventive designs, compositions, processes, or methods consistent with the present disclosure.

In this disclosure, while compositions and processes are often described in terms of "comprising" various components or steps, the compositions and methods can also "consist essentially of" or "consist of" the various components or steps, unless stated otherwise. For example, a method consistent with certain aspects of the disclosed subject matter can comprise; alternatively, can consist essentially of; or alternatively, can consist of; a combining step, a heating step, and separating step.

The terms "a," "an," and "the" are intended to include plural alternatives, e.g., at least one, one or more, and one or more than one, unless otherwise specified. For example, the disclosure of "a solvent," is meant to encompass one, or mixtures or combinations of more than one, solvent, unless otherwise specified.

The term "combining" is used herein to describe any suitable form of combining two or more components, including, for example, batch combining or co-feeding.

The term "combination" means any combination of the two or more components, and can include mixtures, solutions, suspensions, and other forms, all of which will be familiar to those skilled in the art.

The term "about" means that amounts, sizes, formulations, parameters, and other quantities and characteristics are not and need not be exact, but may be approximate including being larger or smaller, as desired, reflecting tolerances, conversion factors, rounding off, measurement errors, and the like, and other factors known to those of skill in the art. In general, an amount, size, formulation, parameter or other quantity or characteristic is "about" or "approximate" whether or not expressly stated to be such. The term "about" also encompasses amounts that differ due to different equilibrium conditions for a composition resulting from a particular initial mixture. Whether or not modified by the term "about," the claims include equivalents to the quantities.

Various numerical ranges are disclosed herein. When a range of any type is disclosed or claimed herein (e.g., "ranging from . . . ", "in the range of from . . . ", "in a range of from") the intent is to disclose or claim individually each possible number that such a range could reasonably encompass, including end points of the range as well as any sub-ranges and combinations of sub-ranges encompassed therein, unless otherwise specified. For example, the present disclosure recites heating the contents of the container to a temperature in a range from 20° C. to about 100° C. in certain aspects. By a disclosure that the temperature can be in a range from about 20° C. to about 100° C., the intent is to recite that the temperature can be any temperature within the range and, for example, can be equal to about 20° C., about 25° C., about 30° C., about 35° C., about 40° C., about 45° C., about 50° C., about 55° C., about 60° C., about 65° C., about 70° C., about 75° C., about 80° C., about 85° C., about 90° C., about 95° C., or about 100° C. Additionally, the temperature can be within any range from about 20° C. to about 100° C. (for example, the temperature can be in a range from about 40° C. to about 70° C.), and this also includes any combination of ranges between about 20° C. and about 100° C. Likewise, all other ranges disclosed herein should be interpreted in a manner similar to this example.

Embodiments disclosed herein can provide the materials listed as suitable for satisfying a particular feature of the embodiment delimited by the term "or." For example, a particular feature of the disclosed subject matter can be disclosed as follows: Feature X can be A, B, or C. It is also contemplated that for each feature the statement can also be phrased as a listing of alternatives such that the statement "Feature X is A, alternatively B, or alternatively C" is also an embodiment of the present disclosure whether or not the statement is explicitly recited.

Although any methods and materials similar or equivalent to those described herein can be used in the practice or testing of the subject matter described herein, the typical methods and materials are herein described.

All publications and patents mentioned herein are incorporated herein by reference for the purpose of describing and disclosing, for example, the constructs and methodologies that are described in the publications, which can be used in connection with the presently described subject matter.

DETAILED DESCRIPTION

Illustrative aspects of the subject matter claimed below will now be disclosed. In the interest of clarity, not all features of an actual implementation are described in this specification. It will be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

The present disclosure is generally directed to one or more methods for extracting boron from an organic solution.

A. Combining.

In an aspect, the method comprises combining a combination with an aqueous solution comprising an alkali hydroxide. The combination comprises an alcohol, an organic solvent, and boron, which can be combined with an aqueous solution comprising about 3 wt. % to about 25 wt. % of an alkali hydroxide, wherein the molar ratio of alkali hydroxide to boron is about 0.5 to about 2.0. As a non-limiting example, the combination can comprise the boron that has been extracted from the acidified brine with an alcohol-kerosene organic solution, as mentioned above in the Background section. As another non-limiting example, the combination can comprise an organic solution comprising boron with an aqueous solution comprising an alkali hydroxide. For example, the organic solution may comprise about 2000 to about 4000 ppm boron, 10-40 vol. % isooctyl alcohol (e.g., EXXAL™-8 commercially available from ExxonMobil), and 60-90 vol. % kerosene.

The combining step can be conducted in any suitable type process, including for example, in a batch process, in a semi-batch process, in a continuous stirred tank reactor, and in other type processes, as will be familiar to those skilled in the art.

In an aspect, the aqueous solution comprises an alkali hydroxide in an amount ranging from about 3 wt. % to about 25 wt. %, based on the total weight of the aqueous solution. The aqueous solution may comprise an alkali hydroxide in an amount ranging from about 5 wt. % to about 25 wt. %, based on the total weight of the aqueous solution. The aqueous solution may comprise an alkali hydroxide in an amount ranging from about 3 wt. % to about 15 wt. %, based on the total weight of the aqueous solution. The aqueous solution may comprise an alkali hydroxide in an amount of about 5 wt. % to about 10 wt. %, based on the total weight of the aqueous solution.

Without being bound by a particular theory, as the concentration of the alkali or other suitable hydroxide increases, the need for water in methods in accordance with this disclosure is substantially reduced as compared to currently available commercial methods. Further, this can eliminate any need for multistage re-extraction mixers/settlers. Still further, this can aid in reducing the volume of aqueous waste stream, and recovery of boron value as sodium borate (Borax) can be precipitated and sold as a byproduct.

Examples of suitable alkali hydroxides include without limitation sodium hydroxide, potassium hydroxide, and lithium hydroxide. Given the teachings of this specification, and depending on the composition of the combination, such as the boron loaded alcohol-kerosene organic solution, those skilled in the art may identify other suitable alkali hydroxides that may be used in accordance with this disclosure.

In an aspect, the combined combination and the aqueous solution has a molar ratio of alkali hydroxide to boron of about 0.5 to about 2.0. The combined combination and the aqueous solution may have a molar ratio of alkali hydroxide to boron of about 0.55 to about 1.0. The combined combination and the aqueous solution may have a molar ratio of alkali hydroxide to boron of about 0.55 to about 0.80.

Examples of suitable alcohols include without limitation one or more of aliphatic alcohols, diols, and polyols, for example, iso-octanols, 2-ethylhexanol, 2-ethyl-1,3-hexanediol, 4-t-butylcatechol, 2-butyl-2-ethyl-1,3-propanediol, and EXXAL™-8. Those skilled in the art, given the teachings of this specification, can select other alcohols that are suitable for use in this invention.

Examples of suitable organic solvents include without limitation kerosene, aliphatic alkanes having six to 12 carbons, such as heptane, hexane, octane, and aromatics such as toluene, xylene, and petroleum ether. ESCAID™-110, which is commercially available from ExxonMobil, is another example of a suitable organic solvent that may be used in accordance with this disclosure. Those skilled in the art, given the teachings of this specification, can select other organic solvents that are suitable for use in this invention. In one aspect of this invention, the organic solvent is a diluent.

In an aspect, the volume ratio of the combination to the aqueous solution that are combined is in the range of from about 10:1 to about 25:1. The volume ratio of the combination to the aqueous solution may be at least about 10:1. The volume ratio of the combination to the aqueous solution may be at least about 13:1. The volume ratio of the combination to the aqueous solution may be at least about 22:1.

B. Heating.

In an aspect, the aqueous solution comprising an alkali hydroxide and the combination comprising an alcohol, an organic solvent, and boron, can be heated to a temperature so as to form an organic layer and an aqueous layer. For example, the content of the container resulting from the combining of the aqueous solution and the combination comprising an alcohol, an organic solvent, and boron, can be heated to a temperature of about 20° C. to about 100° C. During heating, the content forms into an organic layer and an aqueous layer, and boron is extracted from the combination into the aqueous layer. The temperature may be in the range of from about 20° C. to about 100° C. The temperature may be in the range of from about 40° C. to about 80° C. The temperature may be in the range of from about 50° C. to about 70° C.

The heating is continued until the aqueous layer comprises greater than about 95% of the boron from the combination. The duration of the heating can be determined by those skilled in the art, depending on the composition of the content of the container, and given the teachings of this disclosure.

C. Separating.

In an aspect, the method comprises separating the aqueous layer from the organic layer. For example, the aqueous layer can then be separated from the content of the container by means familiar to those skilled in the art. Such methods can additionally comprise separating greater than about 50%, or greater than about 95%, of the boron from the aqueous layer. The boron can be separated in any suitable form as will be familiar to those skilled in the art, for example, as sodium borate salts, and by any suitable means as will be familiar to those skilled in the art, for example, by crystallization after cooling or concentration by evaporation. Further, after separation of the boron, the remaining aqueous layer can be used as all or part of the aqueous solution that is combined with the combination comprising an alcohol, an organic solvent, and boron.

In an aspect, the separation of the aqueous layer from the content of the container can be done by means known to those of skill in the art, for example, without limitation, by decanting, use of a phase separator, or use of a centrifuge; and recovering boron from the aqueous layer can comprise recovering the boron as sodium borate, and by means known to those of skill in the art, for example, without limitation, by precipitation.

The methods disclosed herein are advantageous in that the need for water in such methods is substantially reduced as compared to currently available commercial methods. For example, use of methods of this invention can reduce water consumption from about 1.3 to about 0.4-0.15 unit volume per unit volume of brine, as compared to use of current methods. Further, methods of this invention eliminate any need for multistage re-extraction mixers/settlers. Also, use of methods of this invention aid in reducing the volume of aqueous waste stream, and recovery of boron value as sodium borate (borax) can be precipitated and sold as a byproduct.

EXAMPLES

To facilitate a better understanding of the present disclosure, the following examples of embodiments are provided. In no way should the following examples be read to limit, or to define, the scope of the appended claims.

Example 1. Conducted in a Batch Reactor

A 250-ml PYREX™ flask was charged with 66.3 g of acidified concentrated brine that contained 7,970 ppm boron, and with 161.6 g of an organic solution, which contained 15 vol. % EXXAL™-8 and 85 vol. % ESCAID™-110. The bottle was vigorously shaken by hand for 3 minutes and then the mixture was transferred to a separatory funnel for phase separation. The boron concentration in the separated organic layer was determined by Inductively Coupled Plasma (ICP) to be 3,160 ppm. The instrument used for the ICP determination is a Model 5300 Dual View available from PerkinElmer, Inc.

A 250-ml PYREX™ round-bottomed flask with a stir bar was then charged with 142.8 g portion of the separated organic layer (41.7 mmol B) and with 9.0 g of 13 wt. % sodium hydroxide solution (29.3 mmol NaOH). The mixture was heated to 60° C. via a heating mantle with stirring. Samples of the top organic layer, after allowing the phases to settle, were taken after 15, 30, and 60 minutes of mixing. The aqueous layer at the bottom, which was a slurry mixture, was filtered using a 0.45-µ filter paper. The composition of the organic layer and the aqueous filtrate are given in Table 1.

In the above Example 1, the volume ratio of the separated organic layer to the sodium hydroxide solution is about 22:1.

TABLE 1

Composition of the Organic and Aqueous Liquid Phases from Example 1.

| Time (min) | B in Organic Layer (ppm), ICP | B in Aqueous Filtrate (wt. %), ICP | NaOH in Aqueous Filtrate (wt. %), Titration |
|---|---|---|---|
| 15 | 113 | — | — |
| 30 | 23.4 | — | — |
| 60 | 21.5 | 3.9 | 10 |

Example 2. Conducted in a Batch Reactor

A 500-ml PYREX™ round-bottomed flask with a mechanical overhead stirrer was charged with 214 g of an organic solution that contained 3,430 ppm boron (67.9 mmol B), 15 vol. % EXXAL™-8 and 85 vol. % ESCAID™-110, and with 21.7 g of an aqueous caustic solution that contained 7 wt. % NaOH (37.9 mmol NaOH). The mixture was heated to 60° C. with an agitator speed of 500 rpm. After 30 minutes of mixing at 60° C., the agitation was stopped to allow the phases to settle. The compositions of the top organic and bottom aqueous layers are given in Table 2. The boron concentration in the separated organic layer was determined by Inductively Coupled Plasma (ICP). The instrument used for the ICP determination is a Model 5300 Dual View available from PerkinElmer, Inc.

In the above Example 2, the volume ratio of the organic solution to the aqueous caustic solution is about 13:1.

TABLE 2

Compositions of the Organic and Aqueous Liquid Phases from Example 2.

| Layer | B (ppm), ICP | Na (ppm), ICP |
|---|---|---|
| Organic Layer | 89 | — |
| Aqueous Layer | 36,400 | 43,900 |

Example 3. Conducted in a Continuous Stirred Tank Reactor (CSTR)

The reactor was a jacketed glass vessel of 2.5 inch inner diameter. The mixing was provided by an impeller with dual 2 inch diameter TEFLON™ pitched blades, which was connected to a speed controller. An organic solution that contained 4,350 ppm boron, 20 vol. % EXXAL™-8, and 80 vol. % ESCAID™-110, and an aqueous caustic solution that contained 7.0% NaOH were co-fed to the reactor at a constant flow rate of 4.06 g/min and 0.53 g/min, respectively, while maintaining the reaction temperature at 69° C. with an agitator speed of 700 rpm. The reaction mass left the reactor via an overflow port, located at approximately 350-ml reactor volume, to a 2-liter receiver. Samples were withdrawn directly from the reactor at each turnover volume. The composition of the organic layer samples are given in Table 3. The boron concentration in the separated organic layer was determined by Inductively Coupled Plasma (ICP). The instrument used for the ICP determination is a Model 5300 Dual View available from PerkinElmer, Inc.

In the above Example 3, the volume ratio of the organic solution to the aqueous caustic solution is about 10:1.

TABLE 3

Boron Concentration in the Organic Layers from Example 3.

| Volume Turnover | B in organic (ppm), ICP |
|---|---|
| 2 | 100 |
| 3 | 97 |
| 4 | 99 |
| 5 | 95 |

The subject matter is described above with reference to numerous aspects and specific examples. Many variations will suggest themselves to those skilled in the art in light of the above detailed description. All such obvious variations are within the full intended scope of the appended claims. Other aspects of the subject matter disclosed herein can include, but are not limited to, the following (aspects are described as "comprising" but, alternatively, can "consist essentially of", or "consist of"):

Aspect 1. A method comprising (A) combining in a container: (i) a combination comprising an alcohol, an organic solvent, and boron; (ii) an aqueous solution comprising about 3 wt. % to about 25 wt. % of an alkali hydroxide based on total weight of the aqueous solution; (iii) wherein the molar ratio of the alkali hydroxide to the boron is about 0.5 to 2.0; (iv) wherein the volume ratio of the combination to the aqueous solution is in the range of from about 10:1 to about 25:1; and (B) heating content of the container to a temperature in the range of from about 20° C. to about 100° C. until the content comprises an organic layer and an aqueous layer, and the aqueous layer comprises greater than about 95% of the boron from the combination; and (C) separating the aqueous layer from the content of the container.

Aspect 2. The method defined in Aspect 1, wherein the method further comprises additionally comprising (D) separating greater than about 50% of the boron from the aqueous layer.

Aspect 3. The method defined in Aspect 2, wherein the method further comprises (E) using the aqueous layer remaining after (D) as all or part of the aqueous solution in (A).

Aspect 4. The method as defined in any one of Aspects 1-3, wherein the temperature in (B) is in the range of from about 40° C. to about 80° C.

Aspect 5. The method as defined in any one of Aspects 1-3, wherein the temperature in (B) is in the range of from about 50° C. to about 70° C.

Aspect 6. The method as defined in any one of Aspects 1-3, wherein the alkali hydroxide is sodium hydroxide, potassium hydroxide, or lithium hydroxide.

Aspect 7. The method as defined in any of Aspects 2-6, wherein the boron is separated from the aqueous layer as sodium borate.

Aspect 8. The method as defined in any of Aspects 1-7, wherein the alkali hydroxide is present in the aqueous solution in an amount ranging from about 5 wt. % to about 25 wt. %, based on the total weight of the aqueous solution.

Aspect 9. A method comprising: (A) contacting a combination comprising an alcohol, an organic solvent, and boron with an aqueous solution comprising an alkali hydroxide at conditions sufficient so as to form an organic layer and an aqueous layer, wherein: (i) the alkali hydroxide is present in an amount in the range of from about 3 wt. % to about 25 wt. %, based on the total weight of the aqueous solution; (ii) the molar ratio of the alkali hydroxide to the boron is in the range of about 0.5 to 2.0; (iii) the aqueous layer comprises greater than about 95% of the boron from the combination; and (iv) wherein the volume ratio of the combination to the aqueous solution is in the range of from about 10:1 to about 25:1; and (B) separating the aqueous layer from the organic layer.

Aspect 10. The method as defined in Aspect 9 and 15, wherein the combination and aqueous solution are heated to a temperature is in the range of from about 20° C. to about 100° C.

Aspect 11. The method as defined in any one of Aspects 9-10 and 15 further comprising (C) separating greater than about 50% of the boron from the aqueous layer.

Aspect 12. The method as defined in Aspect 11 and 15 further comprising using the aqueous layer remaining after (C) as all or part of the aqueous solution in (A).

Aspect 13. The method as defined in any one of Aspects 9-12 and 15, wherein the temperature in (A) is in the range of from about 40° C. to about 80° C.

Aspect 14. The method as defined in any one of Aspects 9-13 and 15, wherein the alkali hydroxide is selected from the group consisting of sodium hydroxide, potassium hydroxide, and lithium hydroxide.

Aspect 15. The method as defined in Aspect 11, wherein the boron is separated from the aqueous layer as sodium borate.

Aspect 16. A method comprising: (a) combining in a container: (i) a combination comprising an alcohol, an organic solvent, and boron, and (ii) an aqueous solution comprising about 1 wt. % to about 25 wt. % of an alkali hydroxide, wherein the molar ratio of the alkali hydroxide to the boron is about 0.5 to 2.0; (b) heating content of the container to a temperature of about 20° C. to about 100° C. until the content comprises an organic layer and an aqueous layer, and the aqueous layer comprises greater than about 95% of the boron from the combination; and (c) separating the aqueous layer from the content of the container.

Aspect 17. The method as defined by Aspect 16, additionally comprising: (d) separating greater than about 50% of the boron from the aqueous layer; and (e) using the aqueous layer remaining after (d) as all or part of the aqueous solution in (a); and wherein the temperature in (b) is about 40° C. to about 80° C.; and wherein the temperature in (b) is about 50° C. to about 70° C.; and wherein the alkali hydroxide is sodium hydroxide, potassium hydroxide, or lithium hydroxide; and wherein the boron is separated from the aqueous layer as sodium borate.

What is claimed is:
1. A method comprising:
(A) combining in a container:
   (i) a combination comprising an alcohol, an organic solvent, and boron; and
   (ii) an aqueous solution comprising about 3 wt. % to about 25 wt. % of an alkali hydroxide based on total weight of the aqueous solution;
   (iii) wherein the molar ratio of the alkali hydroxide to the boron is about 0.5 to 2.0;
   (iv) wherein the volume ratio of the combination of (i) to the aqueous solution of (ii) is in the range of from 13:1 to 25:1; and
(B) heating the combination of (i) and the aqueous solution of (ii) in the container to a temperature in the range of from 20° C. to 100° C. until the content comprises an organic layer and an aqueous layer, and the aqueous layer comprises greater than about 95% of the boron from the combination;
(C) separating the aqueous layer from the content of the container;
(D) separating greater than about 50% of the boron from the aqueous layer; and
(E) using the aqueous layer remaining after (D) as all or part of the aqueous solution in (A).

2. The method according to claim 1 wherein the temperature in (B) is in the range of from about 40° C. to about 80° C.

3. The method according to claim 1 wherein the temperature in (B) is in the range of from about 50° C. to about 70° C.

4. The method according to claim 1 wherein the alkali hydroxide is sodium hydroxide, potassium hydroxide, or lithium hydroxide.

5. The method according to claim 1 wherein the boron is separated from the aqueous layer as sodium borate.

6. The method according to claim 1 wherein the alkali hydroxide is present in the aqueous solution in an amount ranging from about 5 wt. % to about 25 wt. %, based on the total weight of the aqueous solution.

\* \* \* \* \*